United States Patent
Kallio et al.

(10) Patent No.: US 10,054,922 B2
(45) Date of Patent: Aug. 21, 2018

(54) APPARATUS AND A SYSTEM FOR CONTROLLING SENSORS

(71) Applicant: iProtoXi Oy, Oulu (FI)

(72) Inventors: Janne Kallio, Oulu (FR); Ari Helaakoski, Oulu (FI); Jarmo Nikula, Oulu (FI)

(73) Assignee: IPROTOXI OY, Oulu (FI)

( * ) Notice: Subject to any disclaimer, the term of this patent is extended or adjusted under 35 U.S.C. 154(b) by 317 days.

(21) Appl. No.: 14/893,853

(22) PCT Filed: May 28, 2014

(86) PCT No.: PCT/FI2014/050426
§ 371 (c)(1),
(2) Date: Nov. 24, 2015

(87) PCT Pub. No.: WO2014/191627
PCT Pub. Date: Dec. 4, 2014

(65) Prior Publication Data
US 2016/0124407 A1 May 5, 2016

(30) Foreign Application Priority Data
May 29, 2013 (FI) .................................... 20135585

(51) Int. Cl.
G05B 19/042 (2006.01)
H04L 29/08 (2006.01)
G06F 9/455 (2018.01)

(52) U.S. Cl.
CPC ....... G05B 19/042 (2013.01); G06F 9/45558 (2013.01); H04L 67/12 (2013.01);
(Continued)

(58) Field of Classification Search
CPC .... G05B 19/042; G06F 9/45558; H04L 67/12
See application file for complete search history.

(56) References Cited

U.S. PATENT DOCUMENTS

| 2010/0145479 A1* | 6/2010 | Griffiths | G01D 21/00 700/17 |
| 2011/0087914 A1* | 4/2011 | Files | G06F 13/4291 713/600 |
| 2016/0124407 A1* | 5/2016 | Kallio | H04L 67/12 700/86 |

FOREIGN PATENT DOCUMENTS

EP 136 325 A2 9/2001
JP 2004118347 A 4/2004
(Continued)

OTHER PUBLICATIONS

International Preliminary Report on Patentability, PCT/FI2014/050426, "An Apparatus and a System for Controlling Sensors", dated Apr. 29, 2015.
(Continued)

*Primary Examiner* — Laura Menz
(74) *Attorney, Agent, or Firm* — Hamilton, Brook, Smith & Reynolds, P.C.

(57) ABSTRACT

Apparatus for controlling sensors is provided. The solution comprises an apparatus having a first interface (102) comprising device addresses for connecting sensors (104, 106), each sensor comprising an identification and registers for monitoring and controlling the sensor; a second interface (108) for communicating with external devices. The apparatus is configured to configured to control the second interface (108) to receive a message in symbol format, the message comprising a sender id, a recipient id and the register address of a sensor; to process messages received from external devices, the messages related to sensors; direct using the first interface the message to the register address if the recipient identification is the identification of sensor.

16 Claims, 3 Drawing Sheets

Figure 1:
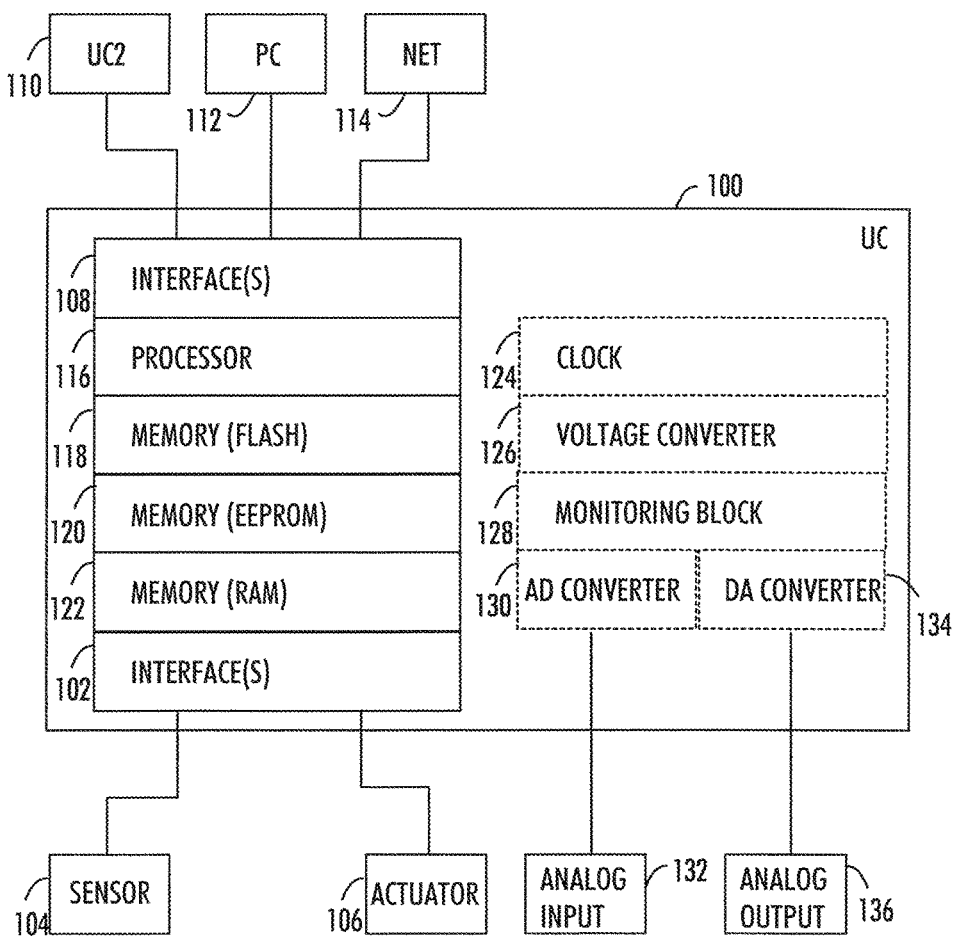

(52) U.S. Cl.
CPC .............. *G05B 2219/25257* (2013.01); *G06F 2009/4557* (2013.01)

(56) References Cited

FOREIGN PATENT DOCUMENTS

| JP | WO 2008/031152 A1 | | 3/2008 | | |
| WO | WO 2008031152 A1 | * | 3/2008 | ........... | A01G 25/167 |
| WO | WO 2008/069409 A1 | | 6/2008 | | |
| WO | WO 201 41 91 62 | * | 12/2014 | ............. | H04L 67/12 |

OTHER PUBLICATIONS

Finnish Search Report, Patent Application No. 20135585, dated Feb. 20, 2014.

* cited by examiner

APPARATUS AND A SYSTEM FOR CONTROLLING SENSORS

This application is the U.S. National Stage of International Application No. PCT/FI2014/050426, filed May 28, 2014, which designates the U.S., published in English, and claims priority under 35 U.S.C. §§ 119 or 365(c) to Finland Application No. 20135585, filed May 29, 2013.

FIELD

The exemplary and non-limiting embodiments of the invention relate generally to controlling sensors. Embodiments of the invention relate especially to an apparatus for communicating and controlling sensors and actuators.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Technology has brought forward small sensors which are easy to install and may provide useful functions. Examples of sensors include temperature, humidity, pressure, motion and light sensors and digital switches. Also the use of small size actuators has increased. To control these sensors and actuators a some kind of processing device is needed.

Presently there exist several different sensor systems comprising a controller which can be programmed to do different operations and functions. However, there are typically many needs to update or tune the program and usage of sensors or just to add or remove any sensor from the system. These changes need the program to be changed. However, the programming is complicated and any program change needs a developing tool, compiling the program and restarting/resetting the system to start the new program. It is also a problem in the current systems that changing the program or sensor setting cause a sensor monitoring or actuator control process to be stopped during the program change. A connection to the sensor system is not possible if you haven't a development tool in a processing device such as computer to execute compiling and then load the new software to the controller of the system. In addition, adding a new sensor or actuator to the system requires similar operations.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor; and at least one memory including computer program code; at least one first interface comprising device addresses for connecting at least one sensor or actuator to the apparatus, each sensor or actuator comprising an identification and one or more registers for monitoring and controlling the at least one sensor or actuator; at least one second interface for communicating with external devices; the at least one memory and the computer program code configured to, with the at least one processor, cause the apparatus at least to perform: control the second interface to receive a message in symbol format, the message comprising at least a sender identification, a recipient identification and the register address of a sensor or actuator; process using a protocol interface messages received from external devices via the at least one second interface, the messages related to sensors or actuators connected to the at least one first interface; direct using the at least one first interface the message to the register address if the recipient identification is the identification of sensor or actuator.

LIST OF DRAWINGS

Figure 2:
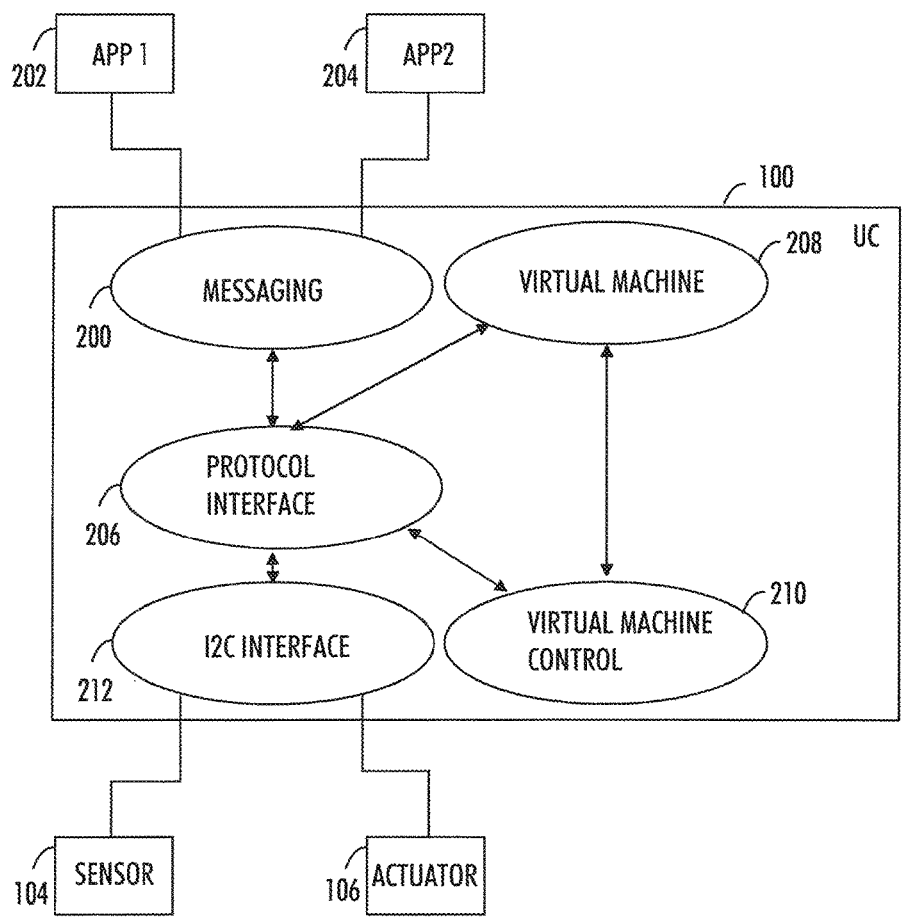
Figure 3:
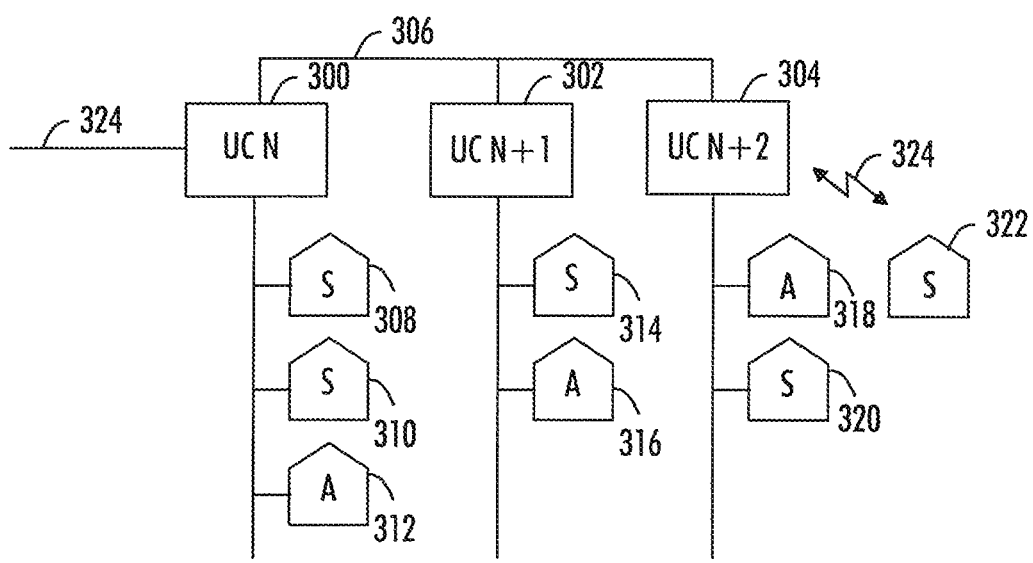

Embodiments of the present invention are described below, by way of example only, with reference to the accompanying drawings, in which FIG. 1 illustrates an example of an apparatus applying embodiments of the invention;

FIG. 2 illustrates the operation of an apparatus applying embodiments of the invention; and FIG. 3 illustrates an example of several microcontrollers.

DESCRIPTION OF SOME EMBODIMENTS

FIG. 1 illustrates an embodiment. The figure illustrates a simplified example of a device in which embodiments of the invention may be applied. FIG. 1 illustrates a microcontroller UC 100. The microcontroller 100 comprises at least one first interface 102 for connecting at least one sensor 104 or actuator 106 to the microcontroller. The at least one interface 102 may be support several different technologies or protocols, such as an Inter-Integrated Circuit (I²C) bus, Serial Peripheral Interface Bus SPI, One-wire or CAN-bus (controller area network), for example.

The microcontroller further comprises at least one second interface 108 for communicating with external devices, such as other corresponding microcontrollers 110, mobile handheld devices (phones, tablets) or computers 112 or devices connected to Internet 114. The at least one interface 108 may be support several different technologies or protocols, such as cellular telecommunication (universal mobile telecommunications system (UMTS), Wireless Local Area Network (WLAN) based on IEEE 802.11 standard, worldwide interoperability for microwave access (WiMAX), Bluetooth®, long term evolution (LTE, known also as E-UTRA), infrared, Dash7, Zigbee, HomePlug green PHY any other radio connection, sound or a wired serial and/or parallel interface. IEEE refers to the Institute of Electrical and Electronics Engineers. LTE and LTE-A are developed by the Third Generation Partnership Project 3GPP.

The microcontroller further comprises at least one processor 116; and at least one memory 118, 120, 122 operationally connected to the processor. The memories may be realized as a flash memory 118, EEPROM (electrically erasable programmable read-only memory) 120 or RAM (random access memory), for example. Memories may be configured to store firmware, software, settings, boot sequence, sensor data and other data.

In some embodiments, the microcontroller further comprises a real time clock 124, a voltage level shifter 126 (for interfaces or driving actuators, a monitoring block 128 (for measuring current consumption or temperature, for example) and an analog-digital converter 130 for receiving analog input 132. The apparatus may further comprise a digital-analog converter 134 for and an analog output 136. The processor 116 may have an internal clock or it can utilize the real time clock 124.

In an example embodiment, the microcontroller may be realized with a microcontroller board comprising the processor and memories, and a number of subboards for the sensors and actuators and accessories.

In an embodiment, the apparatus comprises one bus, for example an I²C bus, and one or more subboards for sensors and actuators which are connected to the bus.

In an embodiment, the microcontroller 100 is a portable unit and does not comprise a user interface such as a keyboard or display.

In an embodiment, when the microcontroller is powered up, it is configured to execute a boot sequence stored in the memory 118, 120, 122. The boot sequence configures and initializes the microprocessor board comprising the processor to communicate with subboards for sensors and actuators and for communicating with other microcontrollers and devices. Next it drives so called a protocol interface.

Sensors 104 can be digital accelerometers, magnetometers, gyros, optical sensors, temperature sensors, digital switches or control buttons, small display elements such as LCD panels or devices which have a I2C or SPI bus such as RFID (Radio-frequency identification) devices or NFC (Near field communication) devices, for example. Actuators 106 can be digital motor drivers, LED drivers, switches, for example.

Present digital sensors and actuators typically comprise a memory with registers. The registers have predetermined addresses. For example, a sensor may comprise a register for the measurement result of x-axis and another register for the measurement result of y-axis. By addressing a given register address the measurement value may be read or a value of the register may be set. Typically the same component type from one manufacturer has the same register set (a similar component from another manufacture may have a different register set.).

As mentioned above, sensors and actuators may be connected to an apparatus of FIG. 1 using a sub boards, which are connected to a bus of the apparatus. One sub board can have one or more sensors or one or more actuators.

FIG. 2 illustrates an example of the operation of the apparatus of FIG. 1. FIG. 2 illustrates different processes executed by the microcontroller 100. The processes may be software stored in the memories 118, 120, 122 and run in the processor 116.

To run applications, the microcontroller software does not need any operating software such as Windows®, Linux®, Android® or iOs®. The processor 116 is configured to run given processes from the one or more memories.

A messaging process 200 controls the at least one second interface 108 for communicating with external devices or applications running in external devices. The messaging process 200 controls the at least one second interface to receive from the applications messages in symbol format, the messages comprising at least a sender identification, a recipient identification and the register address of a sensor or actuator.

The protocol interface 206 is configured to receive data from other devices via the messaging process, process the messages and, if needed, direct the messages to a sensor 104 or actuator 106 via I²C interface 212 (or any other suitable interface) or to a virtual machine 208 or virtual machine control 210.

The protocol interface 206 is further configured to receive using the interface 212 a response to a message from a sensor or actuator or from a virtual machine 208 and transmit via the messaging process the response to the sender of the message.

The protocol interface 206 is further configured to manage a virtual machine 208. The virtual machine is a process configured to run subprograms, which can be loaded using the same protocol as communicating with microcontroller. There is no need to stop and restart the microcontroller, or compile the subprogram of the virtual machine. It is also a benefit of the invention that loading a new message or a new program (based on the messages) to the virtual machine does not cause other processes to control a sensor or an actuator to be stopped. The virtual machine can be named and addressed as a similar device as any sensor or actuator. For outside world it can be a special sensor, or a new sensor which is a combination of two or more sensors depending on a loaded subprogram. The corresponding recipient address/ register address may be defined by the subprogram.

In an embodiment, there may be a separate virtual machine control process 210 which is configured to control the operation of the virtual machine.

In an embodiment, the messages received and transmitted by the messaging process 200 via the at least one second interface 108 are in symbol format. The symbol format may be alphanumeric characters. The information in the messages may be made up of numeric, alphanumeric, or other symbols. The alphanumeric characters may include alphanumeric characters: numbers from "0" to "9", alphabets from "A" to "Z" or "Ö" in Nordic languages, and "space", "$", "%", "@", "*", "+", "−", ".", "/", "\", "|", "{", "}", "~", "*" and ":" as special characters, for example.

As the messaging process 200 is configured to receive via the at least one second interface 108 messages in plain symbol format such as text, it enables any another microcontroller, media device (mobile phone/tablet or PC) to communicate with sensors or actuators connected to the microcontroller with a text format messages without any special software or development tools.

The message data format is fast and simple. In an embodiment, the message data string comprises at least sender identification (ID), recipient ID and the location or identification of a sensor or actuator. The location or identification identifies how the sensor or actuator is addressed on the first interface (I²C bus of the sub board, for example). The message may further comprise other data such as time stamp.

An example of a possible message format is
R˜device22ˆapp_board33@1D24
where "device22" is the sender ID, "app_board33" is the recipient ID, "@" acts as a separator, "1D24" is the sensor (or actuator) identification.

The sender ID may be the identification of an external device, such as an application run in a computer, smartphone or equivalent or another corresponding apparatus. The recipient ID identifies the receiving apparatus and the bus of the apparatus. The sensor (or actuator) identification comprises "1D" as a device address of the sensor (or actuator) on the bus and "24" as a register address of the sensor (or actuator). As a virtual machine has a similar address as a sensor it may be identified as a recipient as well.

The message may be sent by an application 202 or 204 having an ID device22 and received by the messaging process. The message may be a request regarding a sensor value, for example.

The messaging process directs the message to the protocol interface 206. The protocol interface is configured to determine the recipient of the message. In this example case, the recipient is the register "24" of the sensor on the I²C bus having address 1D in an apparatus having ID app_board33. The protocol interface transforms the message to the protocol supported by the I²C interface. Thus, the same message format is used for controlling all sensors independent of the interface protocol. It should be noted that I²C is used here as an example of a possible protocol of first interface 102.

The protocol interface 206 is configured to receive a response from the sensor via the first interface. The response may comprise information on the requested value. The protocol interface 206 is configured to transform the response to a symbol or text format and transmit the response via the second interface to the recipient of the message.

In an embodiment, the response is of the form
D~app_board33^device22@1D24:8D7F
where "app_board33" is the sender ID, "device22" is the recipient ID, "@" acts as a separator, "1D24" is the sensor address, ":" is a separator and "8D7F" is the requested data in 16 bit hexadecimal format. Thus, the response utilises the same format as the original message but switching the sender and recipient IDs.

In an embodiment, the microcontroller can add a timestamp to the message:
D~sensor33^device22@1D24:8D7F%1000000000
where "1000000000" is time in microseconds.

In an embodiment, the microcontroller can add other data, such as current consumption or temperature, to the response. The current consumption or temperature may be obtained from the monitoring block 128.

A microcontroller or messaging process of the microcontroller can also detect and possible filter which sender is sending a message. The message format is the same whether it is sent from another microcontroller, computing device or internet. This makes communication universal and simple.

The same message format is used when messages are directed to sensors, actuators and the virtual machine 208. The virtual machine is configured to utilise the symbol or text format messages as such as program code.

Applications or devices sending messages to the microcontroller may select the virtual machine as a recipient of a message. An example of a possible message format is
R~appl22^board33@9D04
where "appl22" is the sender ID, "board33" is the recipient ID, "@" acts as a separator, "9D00" is the recipient address comprising "9D" as a virtual device address implemented by the virtual machine's program and "00" as a register address.

The messaging application directs the message to the protocol interface 206. The protocol interface is configured to determine the recipient of the message, in this case the virtual machine, and store the message to a command memory configured to act as the virtual machine code.

As an example the set following messages could be sent to the virtual machine control, which forms them to be program steps to be performed as virtual machine process:
W~appl22^board33@9D00:9D 'setting ID for virtual machine
W~appl22^board33@9D04:a0 'setting ID for the Virtual machines program
W~appl22^board33@9D08:1e 'loop begins
W~appl22^board33@9D08:03341cff 'write command 03, led controller address 34, register address 1c, led on ff
W~appl22^board33@9D08:03341cff 'write command 03, led controller address 34, register address 1c, led off 00
W~appl22^board33@9D08:0dff 'loop to beginning The virtual machine is configured to execute the program steps. The program code may instruct the virtual machine to read sensors, transmit responses, drive actuators, i.e. perform the same actions that separate messages instruct the microcontroller to do.

For example, the virtual machine can perform only one step of the above example:
W~appl22^board33@9D08:03341cff 'write command 03, led controller address 34, register address 1c, led on ff
which sets the LED to ON status.

Thus, programming the virtual machine does not require any code rewrite and compiling of code or restarting the microcontroller. The programming may be performed as the microcontroller is running.

The virtual machine can be named and addressed as one sensor or actuator. The virtual machine can also send and receive messages as any outside another device and create a virtual digital sensor based on an analog sensor connected to the microcontroller.

The command memory may be a predetermined section or predetermined memory address in the memory of the apparatus. The virtual machine of the apparatus may be "programmed" by sending messages with program commands to the apparatus. The "program" may be a combination of several messages.

In an embodiment, the messages comprising program commands are preceded with a message comprising a known string which inform the apparatus that a valid virtual machine program is to be received.

The proposed solution makes it easy to change programming of the apparatus and add new sensors. A new sensor may be installed to the apparatus and it is directly available, as long the user is aware of the device address and register addresses of the sensor. A special scan-message may be sent to the apparatus or the virtual machine of the apparatus can perform a scan message. The protocol interface is configured to respond to the scan message by sending a response with device addresses of sensors (or actuators) or virtual machine address.

FIG. 3 illustrates an embodiment related to messaging between microcontrollers. The figure illustrates a simplified example where three microcontrollers 300, 302, 304 of FIG. 1 are connected 306 to each other. The figure shows a wired connection between the apparatuses but a wireless connection is likewise possible. The wired connection may be a serial connection, for example. Microcontroller 300 is connected to two sensors 308, 310 and an actuator 312. Microcontroller 302 is connected to a sensor 314 and an actuator 316. Microcontroller 304 is connected to an actuator 318 and a sensor 320 with a wired connection and to a sensor 322 with a wireless connection 324. The wired connections to sensors may be realized with I²C, OneWire or any other suitable connection, which may be a serial connection, for example. The wireless connection 324 may be realized as an optical, magnetic or RF connection such as a Zigbee connection, for example.

FIG. 3 illustrates an example where the microcontroller 300 acts as a master device for the other microcontrollers 302, 304. The microcontroller 300 has a connection 324 to external devices. The connection may be realized as a TCP/IP (Transmission Control Protocol/Internet Protocol) connection or as a serial connection, such as Universal Serial Bus USB, for example. The protocol interface of the microcontroller 300 may be configured to receive and transmit messages comprising an IP address. The protocol interface of the microcontroller 300 may be configured to receive using connection 324 messages addressed to sensors or actuators connected to the other microcontrollers 302, 304. When such a message is received it may be forward via connection 306 to the microcontroller to which the sensor or actuator is connected to. The other microcontrollers 302, 304 need not be capable of TCP/IP traffic.

The example of FIG. 3 illustrates a system where several microcontrollers are connected. The microcontrollers may comprise similar sensors, for example temperature sensors. Each similar sensor comprises similar register addresses. In an embodiment, the similar sensors having similar register addresses may form a sensor group which may be addressed with a single group message. A single message may be targeted to all sensors of the group. Thus with a single message received by all microcontrollers sensors of a sensor group may be controlled. For example, a calibration message may be sent to calibrate a large number of sensors.

In an embodiment, predetermined addresses may indicate a group message. For example, a given message may be directed to all accelerometer sensors. The protocol interface of an apparatus detects a group message and forwards the message to all accelerometer sensors of the apparatus.

In an embodiment, when a new microcontroller board comprising one or more sensors or one or more actuators is connected to a network comprising microcontrollers the new microcontroller may send a scan message to the network. The message comprises information on the sensors and actuators connected to the new microcontroller. If another microcontroller receiving the message detects it has the same set of sensors and/or actuators of the same type installed it may send as a response comprising virtual machine code stored in the microcontroller to the new microcontroller. The new microcontroller receives the code and may store it to its memory and start to run it.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claim.

The invention claimed is:

1. An apparatus, comprising:
   at least one processor; and
   at least one memory including computer program code;
   at least one first interface comprising device addresses providing the apparatus a connection to at least one sensor or actuator to the apparatus, and one or more registers for monitoring and controlling the at least one sensor or actuator, each sensor or actuator comprising an identification;
   at least one second interface providing a connection for communication with external devices;
   the at least one memory and the computer program code configured to, with the at least one processor, cause the apparatus at least to perform:
   control the second interface to receive a message in symbol format, the message comprising at least a sender identification, a recipient identification and the register address of a sensor or actuator, and a request of a sensor value or a drive command to an actuator;
   process using a protocol interface messages received from external devices via the at least one second interface, the messages related to sensors or actuators connected to the at least one first interface; the processing comprising translating the symbols format command to a protocol supported by the first interface the sensor or actuator is connected to;
   direct using the at least one first interface the transformed message to the register address if the recipient identification is the identification of sensor or actuator.

2. The apparatus of claim 1, the apparatus being configured to run a virtual machine configured to process messages received via the at least one second interface, the virtual machine comprising an identification, if the recipient identification is the identification of the virtual machine.

3. The apparatus of claim 1, the apparatus being configured to run a virtual machine configured to process program code based on messages received via the at least one second interface and stored in a command memory, the virtual machine comprising an identification; and store a received program code step based on the messages received via the at least one second interface in the command memory of the virtual machine if the recipient identification is the identification of the virtual machine.

4. The apparatus of claim 2, the virtual machine apparatus being configured to perform messages stored in the command memory as program code producing similar operations as messages received via the at least one second interface.

5. The apparatus of claim 3, the apparatus being configured to receive virtual machine program code as one or more messages received via the at least one second interface using recipient identification of virtual machine.

6. The apparatus of claim 5, wherein the virtual machine program code implements a virtual sensor or actuator.

7. The apparatus of claim 1, the apparatus being configured to receive using the at least one first interface a response to a message from a sensor or actuator the message was directed to;

control the at least one second interface to transmit the response to the sender of the message.

8. The apparatus of claim 7, the apparatus being configured to add further data to the response.

9. The apparatus of claim 7 wherein the further data comprises at least one of time stamp, current consumption, temperature.

10. The apparatus of claim 1, the apparatus being configured to control the at least one second interface to forward a received message to another apparatus.

11. The apparatus of claim 1, the at least one memory and the computer program code further configured to, with the at least one processor, cause the apparatus at least to perform:

utilise different protocols when communicating with sensors or actuators connected to different first interfaces.

12. The apparatus of claim 1, the at least one memory and the computer program code further configured to, with the at least one processor, cause the apparatus at least to perform:

utilise different protocols when communicating with external devices connected to different second interfaces.

13. The apparatus of claim 1, wherein the received messages or transmitted responses further comprise an Internet Protocol address.

14. The apparatus of claim 2, the at least one memory and the computer program code further configured to, with the at least one processor, cause the apparatus at least to perform:

detect that the apparatus is connected to a network comprising one or more corresponding apparatuses;

transmit to the network a message comprising information on sensors and/or actuators connected to the apparatus;

receive from a corresponding apparatus a message having the identification of the virtual machine as the recipient identification, the message comprising commands related to sensors or actuators;

store the message in a command memory of a virtual machine.

15. The apparatus of claim 2, the apparatus being connected to a network comprising one or more corresponding apparatuses, the at least one memory and the computer program code further configured to, with the at least one processor, cause the apparatus at least to perform:

receive from the network a message comprising information on sensors and/or actuators connected to another corresponding apparatus joining the network;

detect that the joining apparatus has the same sensors and/or actuators as the apparatus;

transmit to the joining apparatus a message having the identification of the virtual machine as the recipient identification, the message comprising commands related to sensors or actuators.

16. A system comprising more than one apparatus of claim 1, wherein each apparatus comprises similar sensors or actuators having the same identification and the same registers, the more than one apparatus being configured to receive a message directed to the similar more than one sensors and direct the message to the more than one sensors.

* * * * *

UNITED STATES PATENT AND TRADEMARK OFFICE
CERTIFICATE OF CORRECTION

PATENT NO. : 10,054,922 B2  
APPLICATION NO. : 14/893853  
DATED : August 21, 2018  
INVENTOR(S) : Janne Kallio, Ari Helaakoski and Jarmo Nikula Page 1 of 1

It is certified that error appears in the above-identified patent and that said Letters Patent is hereby corrected as shown below:

On the Title Page

In the Inventors item (72) please delete "Janne Kallio, Oulu (FR);" and insert -- Janne Kallio, Oulu (FI); --.

Signed and Sealed this
Sixteenth Day of October, 2018

Andrei Iancu
*Director of the United States Patent and Trademark Office*